United States Patent Office 3,211,677
Patented Oct. 12, 1965

3,211,677
VINYL CHLORIDE POLYMER FOAMS BY TREATMENT WITH A BIS (AZIDOFORMATE) MODIFYING AGENT AND A BLOWING AGENT
George B. Feild, New Castle, and John R. Lewis, Wilmington, Del., assignors to Hercules Powder Company, Wilmington, Del., a corporation of Delaware
No Drawing. Filed July 22, 1963, Ser. No. 296,426
10 Claims. (Cl. 260—2.5)

This invention relates to a process for preparing polymer foams. More particularly, the invention relates to a process for preparing modified foams of vinyl chloride polymers and to the modified foams so prepared.

It is known to use vinyl chloride polymers in the preparation of expanded materials, i.e., foams, by incorporating in the polymer a chemical blowing agent which under the influence of heat evolves gas whereby cells are formed and a low density product is produced. However, the prior art processes suffer several disadvantages. For example, pressures of about 10,000 p.s.i. are usually required during the decomposition of the blowing agent, then the product must be cooled (still under pressure) and finally reheated without the application of pressure to effect expansion. The foams resulting from such processes remain thermoplastic and thoroughly soluble in common poly(vinyl chloride) solvents.

Now in accordance with this invention it has unexpectedly been found that modified foams of vinyl chloride polymers can be prepared in a one-step heating process, with or without the application of pressure, by heating a blend of a vinyl chloride polymer, a blowing agent and an azidoformate compound at a temperature sufficient to release the gas from said blowing agent, which temperature is also effective for the modification reaction with the azidoformate compound whereby blowing and modification of the vinyl chloride polymer is effected. By using this process, it is possible to produce either rigid or flexible foams of any desired density, having uniform closed cell structures. In addition, by regulating the amount of azidoformate used, it is possible to produce either infusable, insoluble or thermoplastic soluble foams.

The azidoformates used in accordance with this invention are solids or oils having a boiling point of at least about 100° C. at a pressure of 70 mm. mercury and having the general formula $$R\left(O\overset{O}{\underset{\|}{C}}N_3\right)_x$$

where $x$ is at least 1, preferably from about 1 to about 100, and R is an organic radical, inert to modification reactions, containing at least one carbon atom per azidoformate group. Exemplary of the azidoformates used are the alkyl azidoformates such as n-octadecyl azidoformate, tetramethylene-bis(azidoformate), penthamethylene-bis(azidoformate); the cyclic alkyl azidoformates such as 1,4-cyclohexanedimethyl-bis(azidoformate), 2-(1-p-menthenyl-8-oxy)ethyl azidoformate; 2-norborn-5-enyl methylene azidoformate; the aralkyl azidoforates such as α,α′-p-xylene-bis(azidoformate); the aromatic azidoformates such as phenyl azidoformate, 2,2-isopropylidene-bis(p,p′-phenyl azidoformate); the azidoformate ethers such as 2,2′-oxydiethyl-bis(azidoformate), 2,2′-oxydipropyl-bis(azidoformate), 2,2′-ethylenedioxydiethyl-bis(azidoformate), the tetraazidoformate of pentaerythritol-propylene oxide adduct having the general formula $$C\left(\underset{CH_2-O-CH_2\overset{CH_3}{\underset{|}{C}}H-O-\overset{O}{\underset{\|}{C}}N_3}{}\right)_4$$

the azidoformate thioethers such as 2,2′-thiodiethyl-bis-(azidoformate), 4,4′-thiodibutyl-bis(azidoformate; etc. It will, of course, be obvious to those skilled in the art that still other azidoformates containing functional groups, which are inert to modification reactions, such as halogen, COOR, $$-\overset{O}{\underset{\|}{C}}-$$

etc., groups, are included in the above definition. The azidoformates used in this invention can be prepared in various ways, as for example by reacting the respective chloroformate with an excess, i.e., from about 1.05 mole to about 10 moles per equivalent of chloroformate, of an alkali azide.

Any of the well-known chemical blowing agents can be used in the preparation of the foams in accordance with this invention as, for example azo bis(formamide), diazoaminobenzene, N,N′-dinitrosopentamethylene tetramine, N,N′-dimethyl-N,N′-dinitrosoterephthalamide, p,p′-oxybis(benzene sulfonyl semicarbazide), azo bis (isobutyronitrile), p,p′-oxy-bis(benzene sulfonyl hydrazide), p,p′-diphenyl-bis(sulfonyl hydrazide), benzene-sulfonyl hydrazide, m-benzene-bis(sulfonyl hydrazide), etc. Any of the well-known solvent blowing agents can also be used in this invention as, for example, monochlorotrifluoromethane, monochlorodifluoromethane, dichlorotetrafluroroethylene, trichloroethylene, chloroform, carbon tetrachloride, and low boiling hydrocarbons, such as butane, pentane, hexane, toluene, etc. Accordingly, any compound which decomposes or volatilizes to yield at least one mole of gas per mole of blowing agent at a temperature of 190° C. or less can be used.

Any vinyl chloride polymer, homopolymer, or copolymer containing at least about 20 mole percent, most preferably 60 mole percent, of vinyl chloride can be used in the preparation of the modified foams in accordance with this invention. Exemplary of these polymers are poly(vinyl chloride), vinyl chloride–vinyl acetate copolymers, vinyl chloride–vinyl acetal copolymers, vinyl chloride–vinylidene chloride copolymers, vinyl chloride–acrylonitrile copolymers, vinyl chloride–1,2-ethylene dicarboxylic acid alkyl ester copolymers, such as vinyl chloride-diethyl fumarate copolymers, vinyl chloride–diethyl maleate copolymers; vinyl chloride–vinylidene chloride–acrylonitrile terpolymers, vinyl chloride–vinyl acetate–maleic anhydride terpolymers, etc. Either plastisol or plastic grade vinyl chloride polymers can be used since this invention is equally applicable to either type. In addition to the above, blends of vinyl chloride polymers with certain other polymers can be used. Exemplary polymers which can be blended with a vinyl chloride polymer are polychloroprene, butadiene–acrylonitrile copolymers, butadiene–methyl isopropenyl ketone copolymers, butadiene–vinyl pyridine copolymers, butadiene–ethyl acrylate copolymers, polyisobutylene, polyethylene, styrene–butadiene copolymers, natural rubber, etc. These blends will preferably contain at least about 80% by weight of vinyl chloride polymer.

Various types of foams can be prepared from the vinyl chloride polymers described above, depending upon the specific polymer used. For example, poly(vinyl chloride) yields rigid and semi-rigid foams. Flexible foams are obtained from poly(vinyl chloride) plastisols and the vinyl chloride copolymers.

In preparing foams in accordance with this invention, the vinyl chloride polymer is first blended with an azidoformate and a blowing agent. Any desired means can be used to bring about this blending. When a solvent blowing agent is used, a convenient method for forming the desired expandable blend is to mix the vinyl chloride polymer and an azidoformate, pass the mixture through an extruder, chop the extruded material into pellets and then soak the pellets in the solvent blowing agent until the desired amount of the latter has been absorbed. When a chemical blowing agent is used, the azidoformate and blowing agent can be mixed with a diluent (which can also contain a stabilizer or other modifier for the vinyl chloride polymer), and then the polymer in finely divided form can be added and mixed into a slurry. On evaporation of the diluent an intimate mixture of the polymer, blowing agent and azidoformate is obtained. When a poly(vinyl chloride) plastisol is used, the azidoformate and blowing agent can readily be mixed into the dispersion.

The modifying and blowing of the above described expandable blends is then carried out by heating the blend to a temperature from about 120° C. to about 200° C. The period of time required to effect the desired degree of blowing will depend on the temperature used etc., but will usually be about 3 minutes to about 3 hours, more preferably from about 5 minutes to about 1 hour. The exact temperature to be used will then depend on the azidformate and blowing agent used, the length of time the blend is heated, etc. The modification and blowing usually take place simultaneously but may take place sequentially, depending on the type of foaming process used. Where blowing is conducted in an open vessel, cross-linking will usually be required to prevent the foam from collapsing but must not be complete before expansion. Best results can be obtained by selecting an azidoformate and blowing agent which decomposes (or volatilize in the case of the solvent blower) at about the same temperature.

The amount of azidoformate used in the preparation of the foams will preferably be from about 0.1% to about 20%, more preferably from about 1% to about 10%, by weight of the polymer. The amount of blowing agent incorporated will obviously depend upon the degree of blowing desired, that is, the density desired for the final foamed product and the type of blowing agent used. In general, the amount will be within the range of from about 1% to about 30% by weight of the polymer.

The following examples are presented for purposes of illustration, parts and percentages being by weight unless otherwise specified. The extent of cross-linking in the examples is indicated by the resulting vulcanizates' insolubility in (expressed as percent gel) a solvent, which is a complete solvent for the uncross-linked polymers. Percent gel is indicative of the percentage of polymer that is cross-linked.

In the examples, percent gel was determined as follows: A one-half inch diameter by 0.050 inch thick disc-shaped specimen was weighed and macerated in an excess of the solvent for 4 hours at 80° C. The specimen was then dried in vacuum for 4 hours at 80° C. and reweighed. The initial and dry weights were each corrected (for non-polymer components of the specimen) to a 100% polymer base. From these figures, percent gel is calculated by the formula $$\frac{\text{corrected dry weight}}{\text{corrected initial weight}} \times 100 = \text{percent gel}$$

*Example 1*

This example illustrates the preparation of a flexible foam from a poly(vinyl chloride) plastisol, a blowing agent and tetramethylene bis(azidoformate). The following formulation was prepared:

Ingredients: Parts
    Poly(vinyl chloride) [a] _____ 100
    Plasticizer [b] _____ 100
    Dibasic lead phthalate _____ 10
    p,p'-Oxy bis(benzene sulfonyl hydrazide) ____ 15
    Tetramethylene bis(azidoformate) _____ 10

[a] Poly(vinyl chloride) having a specific gravity of 1.40 at 25° C. and a specific viscosity of 0.60 as determined at 20° C. on a 1% solution in methyl isobutyl ketone.
[b] Prepared from adipic acid and ethylene glycol.

The formulation was poured into an open beaker and heated for 30 minutes at a temperaure of 150° C. The resulting foam was a uniform, substantially closed cell material having a density of 18 pounds per cubic foot. It was tested and found to have a percent gel of 116 as determined in cyclohexanone. A control formation was prepared exactly the same way except for the omission of the azidoformate. When the control was heated at a temperature of 150° C. for 30 minutes, it first expanded and then completely collapsed. The resulting material was quite dense and had a percent gel of 0 as determined in cyclohexanone.

*Examples 2 and 3*

These examples illustrate the preparation of flexible foams from the poly(vinyl chloride) plastisol as described in Example 1, using a different blowing agent and a different azidoformate. Each formulation was poured into an open beaker and heated as described in Example 1. The specific formulations and the density and percent gel (as determined in cyclohexanone) of the resulting foams are tabulated below.

| Ingredients | Parts | |
|---|---|---|
| | Example 2 | Example 3 |
| Poly(vinyl chloride) [a] | 100 | 100 |
| Plasticizer [b] | 100 | 100 |
| Dibasic lead phthalate | 10 | 10 |
| p,p'-Oxy bis(sulfonyl hydrazide) | 15 | |
| N,N'-dinitrosopentamethylenetetramine | | 15 |
| Tetramethylene bis(azidoformate) | | 10 |
| 1,4-cyclohexane dimethyl bis(azidoformate) | 10 | |
| Density (pounds per cubic foot) | 14 | 16 |
| Percent gel | 89 | 91 |

[a] As described in Example 1.
[b] As described in Example 1.

*Example 4*

This example illustrates the praparation of a semi-rigid foam. The finely divided sample of the poly(vinyl chloride) described in Example 1, butylbenzylphthalate, dibasic lead phthalate, azo bis(formamide), and tetramethylene bis(azidoformate) were slurried in a liquid dispersng blend of 70% n-heptane, 20% toluene, and 10% methyl ethyl ketone. The liquid dispersant was allowed to evaporate to room temperature leaving a dry, white powder containing the following amounts of ingredients.

Ingredients: Parts
    Poly(vinyl chloride) _____ 100
    Butylbenzylphthalate _____ 50
    Dibasic lead phthalate _____ 10
    Azo bis(formamide) _____ 1
    Tetramethylene bis(azidoformate) _____ 3

The dry mixture was heated in a closed mold for 5 minutes at a temperature of 175° C. and a pressure of 500 p.s.i. The resulting foam was a semi-rigid, closed cell structure. It was tested and found to have a percent gel of 89 as determined in methyl ethyl ketone.

*Example 5*

This example illustrates the preparation of a rigid foam. The ingredients tabulated below were co-dissolved and dispersed in 200 parts of methyl ethyl ketone.

Ingredients: Parts
    Vinyl chloride-vinyl acetate copolymer [a] _____ 100
    Dibasic lead phthalate _____ 10
    Azo bis(formamide) _____ 1
    Tetramethylene bis(azidoformate) _____ 3

[a] Containing 85% by weight vinyl chloride and 15% by weight of vinyl acetate, having a specific gravity of 1.35 at 25° C. and a specific viscosity of 0.55 as determined at 20° C. on a 1% solution in methyl isobutyl ketone.

The methyl ethyl ketone was allowed to evaporate at room temperature and the resulting dry mixture heated for 15 minutes at a temperature of 150° C. under a pressure of 500 p.s.i. The resulting foam was a rigid, closed cell structure having a density of approximately 18 pounds per cubic foot. It was tested and found to have a percent gel of 90 as determined in methyl ethyl ketone.

*Example 6*

This example illustrates the preparation of a rigid foam of a blend of poly(vinyl chloride) with chlorinated, low density polyethylene using a solvent blowing agent. The following ingredients were compounded on a two-roll mill at a temperature of 160° C. for 15 minutes.

| Ingredients: | Parts |
|---|---|
| Poly(vinyl chloride)a | 90 |
| Chlorinated low density polyethylene | 10 |
| Mixed barium cadmium laurate | 5 |
| Phosphite stabilizer | 1 |
| Tetramethylene bis(azidoformate) | 0.3 | a As described in Example 1.

The resulting mixture was chopped into small particles and soaked in 30 parts of toluene. The mixture was then placed in a high pressure autoclave and heated in an atmosphere of nitrogen at a temperature of 200° C. under a pressure of 600 p.s.i. After 1 hour, the pressure was suddenly released and the material expanded to the dimensions of the inner wall of the autoclave. The resulting rigid foam consisted predominantly of closed cells of uniform size and had a density of 4 pounds per cubic foot. It was tested and found to have no detectable gel. A control was prepared under the exact same conditions except for the omission of the azidoformate. After heating in the autoclave and suddenly releasing the pressure as described above, the control was removed and found to consist of a nonuniform, partially expanded shell around the wall of the autoclave with a collapsed hollow interior.

What we claim and desire to protect by Letters Patent is:

1. A process for preparing a modified cellular vinyl chloride polymer material which comprises heating a blend of a vinyl chloride polymer with a blowing agent and an azidoformate having a boiling point of at least about 100° C. at a pressure of 70 mm. of mercury and having the general formula

where $x$ is at least 1 and R is an organic radical inert to modification reactions, at a temperature sufficient to release gas from said blowing agent, whereby blowing and modification of the polymer are effected.

2. The process of claim 1 wherein the azidoformate is tetramethylene bis(azidoformate).

3. The process of claim 1 wherein the vinyl chloride polymer is poly(vinyl chloride).

4. The process of claim 1 wherein the vinyl chloride polymer is vinyl chloride–vinyl acetate copolymer.

5. The process of claim 1 wherein the vinyl chloride polymer is a blend of poly(vinyl chloride) and chlorinated polyethylene.

6. An expandable vinyl chloride polymer composition comprising a blend of
   (1) a vinyl chloride polymer,
   (2) a blowing agent, and
   (3) an azidoformate having a boiling point of at least about 100° C. at a pressure of 70 mm. of mercury and having the general formula

where $x$ is at least 1 and R is an organic radical inert to modification reactions.

7. The composition of claim 6 wherein the vinyl chloride polymer is poly(vinyl chloride).

8. The composition of claim 6 wherein the vinyl chloride polymer is vinyl chloride–vinyl acetate copolymer.

9. The composition of claim 6 wherein the vinyl chloride polymer is a blend of poly(vinyl chloride) and chlorinated polyethylene.

10. A vinyl chloride polymer foam prepared by heating the composition of claim 6.

No references cited.

MURRAY TILLMAN, *Primary Examiner.*